(No Model.)
J. BINGAMAN.
PRUNING IMPLEMENT.
No. 470,636. Patented Mar. 8, 1892.
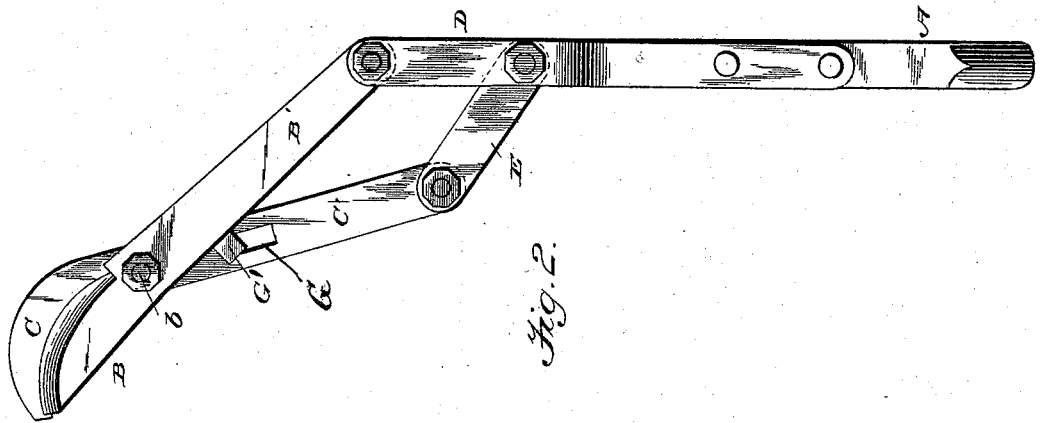
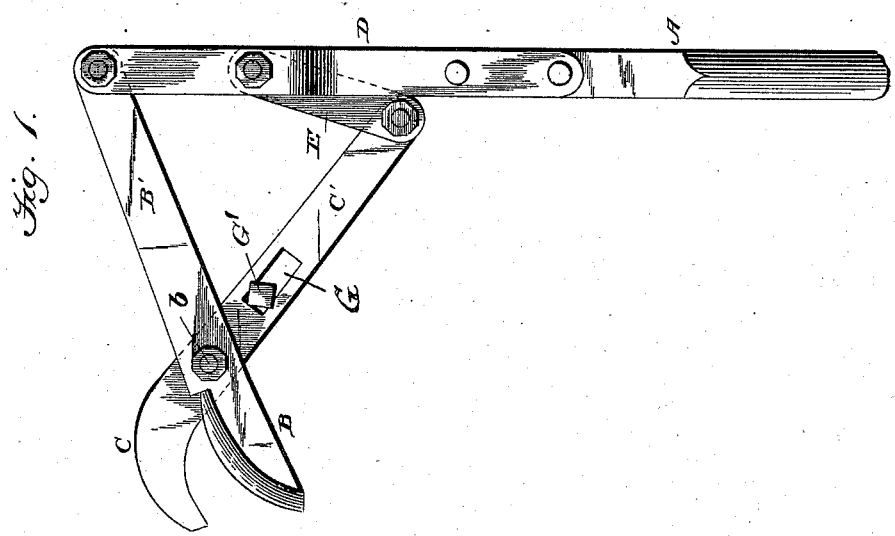
Witnesses:
Inventor
Joseph Bingaman
By J. M. Tallmadge
Attorney.

UNITED STATES PATENT OFFICE.

JOSEPH BINGAMAN, OF PRINCETON, KANSAS.

PRUNING IMPLEMENT.

SPECIFICATION forming part of Letters Patent No. 470,636, dated March 8, 1892.

Application filed September 12, 1891. Serial No. 405,489. (No model.)

*To all whom it may concern:*

Be it known that I, JOSEPH BINGAMAN, a citizen of the United States, residing at Princeton, in the county of Franklin and State of Kansas, have invented a new and useful Improvement in Tree-Pruning Shears, of which the following is a specification.

My invention relates to improvements in that class of pruning implements having two cutting-jaws pivoted at the top end of a handle or staff and adapted to be operated by drawing down upon the handle to bring the jaws together to sever the limb; and it has for its object to limit the movement of the jaws when cutting and insure their return to an open position, and in carrying out my invention I proceed as follows, reference being had to the accompanying drawings, forming a part hereof, wherein—

Figure 1 is a view in elevation of a tree-trimmer constructed according to my invention as in its normal position, and Fig. 2 is a similar view showing the position of the parts when a branch of a tree is severed.

The letter A designates the staff or handle, that carries at its top end the shears, which shears are composed of the jaws B and C, pivoted together at *b* and having extensions B′ and C′. The inner end of extension B′ is pivoted to the top end of a frame D, which frame in turn is secured to the staff A, and the extension C′ of jaw C is pivoted to a short arm E, which in turn is pivoted to the frame D at a suitable point below the pivot of the end of jaw B. Instead of pivoting the jaws to the frame, such may be pivoted directly to the staff.

In the arm C′ of the jaw C is a slot G, through which passes a bolt with nut on one side and head G′ on the other to form an adjustable stop to engage the lower edge of the arm B′ of jaw B, whereby the movement of the jaws are limited, as shown in Fig. 2. The slot G permits of the adjustment of the stop as the cutting-edge of the jaws wear away, and by this provision the return of the jaws to an open position is assured.

As shown in Fig. 1, the normal position of the shears is with its cutting-jaws open, so that when to be used the said jaws are simply caused to engage the branch of a tree to be severed, when upon drawing downward upon the staff the jaws will be closed and the branch quickly cut in two.

Having thus described my invention, I claim as new and desire to secure by Letters Patent of the United States—

In a tree-pruning implement, the combination, with the staff A, jaw B B′, pivoted to the top end thereof, and arm E, pivoted at one end to the said staff, of the jaw C C′, pivoted to the jaw B B′ and arm E and having a slot G and stop G′, adjustable in said slot, to limit the movement of the jaws and insure their return to an open position, as described and shown.

JOSEPH BINGAMAN.

Witnesses:
WM. R. DEAN,
R. F. MASON.